(12) United States Patent
Jung et al.

(10) Patent No.: US 8,345,806 B2
(45) Date of Patent: Jan. 1, 2013

(54) APPARATUS AND METHOD FOR DETECTING SIGNAL BASED ON QR-DECOMPOSITION IN MULTIPLE INPUT MULTIPLE OUTPUT WIRELESS COMMUNICATION SYSTEM

(75) Inventors: Sung-Yoon Jung, Seoul (KR); Sang-Boh Yun, Seongnam-si (KR); Young-Hoon Kwon, Seongnam-si (KR); Sung-Soo Hwang, Yongin-si (KR); Jong-Ho Lee, Seoul (KR); Hyun-Cheol Park, Daejeon-si (KR); Hyoun-Kuk Kim, Ulsan-si (KR); Ki-Hwan Jeon, Seoul (KR)

(73) Assignees: Samsung Electronics Co., Ltd., Suwon-Si (KR); ICU Research and Industrial Cooperation Group, Daejeon-Si (KR)

( * ) Notice: Subject to any disclaimer, the term of this patent is extended or adjusted under 35 U.S.C. 154(b) by 918 days.

(21) Appl. No.: 12/154,954

(22) Filed: May 28, 2008

(65) Prior Publication Data

US 2008/0298491 A1 Dec. 4, 2008

(30) Foreign Application Priority Data

May 29, 2007 (KR) .................. 10-2007-0051896

(51) Int. Cl.
*H04B 7/10* (2006.01)
(52) U.S. Cl. ........ 375/347; 375/260; 375/147; 375/264; 455/135; 455/303; 455/160.1
(58) Field of Classification Search .............. 375/260
See application file for complete search history.

(56) References Cited

U.S. PATENT DOCUMENTS

| | | | | |
|---|---|---|---|---|
| 5,016,258 | A * | 5/1991 | Tanaka et al. | 375/242 |
| 5,892,801 | A * | 4/1999 | Schneider | 375/348 |
| 7,397,843 | B2 | 7/2008 | Grant et al. | |
| 2005/0259771 | A1 * | 11/2005 | Higuchi et al. | 375/347 |
| 2006/0280114 | A1 * | 12/2006 | Osseiran et al. | 370/208 |

FOREIGN PATENT DOCUMENTS

KR 100766065 B1 10/2007

OTHER PUBLICATIONS

Kihwan Jean, et al., "An Efficient QRD-M Algorithm Using Partial Decision Feedback Detection", Systems and Computers 2006, Fortieth Asilomar Conference on Signals, Oct. 29, 2006, p. 1658-1661.
S. Nagayama, et al., "A Proposal of QRM-MLD for Reduced Complexity of MLD to Detect MIMO Signals in Fading Environment", Vehicular Technology Conference 2006, Sep. 25-28, 2006, 5 pages.

* cited by examiner

*Primary Examiner* — Lihong Yu

(57) ABSTRACT

An apparatus and a method are provided for detecting N number of TX signals in a MIMO wireless communication system. The apparatus includes an RF processor, a channel estimator, and a signal detector. The RF processor converts signals, received through multiple antennas, into baseband signals. The channel estimator estimates channel information of the respective antennas by using the received signals. The signal detector arranges the baseband signals of the respective antennas on the basis of the channel information, calculates a threshold value of each stage, and selects symbols with a cumulative metric smaller than or equal to the threshold value as candidates at each stage, to detect a TX signal vector with N number of symbols.

20 Claims, 7 Drawing Sheets

FIG.5A
FIG.5B
FIG.5C
FIG.5D
FIG.5E
FIG.5F

APPARATUS AND METHOD FOR DETECTING SIGNAL BASED ON QR-DECOMPOSITION IN MULTIPLE INPUT MULTIPLE OUTPUT WIRELESS COMMUNICATION SYSTEM

CROSS-REFERENCE TO RELATED APPLICATION(S) AND CLAIM OF PRIORITY

The present application claims priority under 35 U.S.C. §119 to an application filed in the Korean Intellectual Property Office on May 29, 2007 and assigned Serial No. 2007-51896, the contents of which are incorporated herein by reference.

TECHNICAL FIELD OF THE INVENTION

The present invention relates generally to a Multiple Input Multiple Output (MIMO) wireless communication system, and in particular, to an apparatus and method for detecting different signals transmitted through multiple antennas in a MIMO wireless communication system.

BACKGROUND OF THE INVENTION

Recently, a MIMO technique using multiple transmit and receive (TX/RX) antennas is attracting much attention as one of techniques to satisfy an increasing demand for high-speed and high-quality data transmission. Since the MIMO technique performs communication using multiple channels of multiple antennas, it can greatly increase the channel capacity in comparison with the case of using a single antenna. For example, if a transmitter and a receiver use M number of TX antennas and M number of RX antennas, the channels of the antennas are independent of one another, and the bandwidth and the total TX power are fixed, the average channel capacity increases M times in comparison with the case of using a single antenna.

A Vertical-Bell Labs Layered Space Time (V-BLAST) system is one of systems that are designed to transmit/receive different independent signals through multiple antennas in a MIMO wireless communication system. A Maximum Likelihood (ML) detection scheme is an example of a scheme that provides the optimal RX performance when different signals are transmitted through multiple antennas as in the V-BLAST system. However, since the computational complexity of the ML detection scheme increases exponentially with an increase in the modulation order and the number of TX antennas, the ML detection scheme is very difficult to implement in practice.

A QR Decomposition-M (QRD-M) detection scheme is one of schemes that have relatively low complexity while having a similar performance to the ML detection scheme. The QRD-M detection scheme uses the R matrix characteristics of a QR-decomposed channel matrix to arrange signals in a tree structure as illustrated in FIG. 1, and selects M number of candidates at each stage to detect a TX signal. In the tree structure, the number of stages is equal to the number of TX antennas and each candidate has as many sub candidates as the modulation order.

A receiver using the QRD-M detection scheme selects M number of candidates with the smallest cumulative metric at each stage, and expands as many as candidates as the modulation order at the next stage with regard to only the previously selected candidates. The receiver repeats this process until the last stage to detect the final signals of the respective antennas. Herein, if the value M is equal to the modulation order, the receiver searches all the paths in the tree, which is equivalent to the use of the ML detection scheme. Thus, the detection performance of the QRD-M detection scheme depends on the value M. In order for the QRD-M detection scheme to approach the ML detection scheme in performance, the receiver must set the value M close to the modulation order. However, the computational complexity of the QRD-M detection scheme increases with an increase in the value M, which causes difficulty in implementation. There is therefore a need in the art for techniques to provide a modified QRD-M detection scheme that has low computational complexity while having a similar performance to the ML detection scheme.

SUMMARY OF THE INVENTION

To address the above-discussed deficiencies of the prior art, it is a primary object of the present invention to substantially solve at least the above problems and/or disadvantages and to provide at least the advantages below. Accordingly, an object of the present invention is to provide an apparatus and method for detecting signals of respective antennas with low computational complexity in a MIMO wireless communication system.

Another object of the present invention is to provide an apparatus and method for performing QRD-M detection, which has low computational complexity while having a similar complexity to ML detection, in a MIMO wireless communication system.

Another object of the present invention is to provide an apparatus and method for determining a candidate selection threshold value of each stage for QRD-M detection in a MIMO wireless communication system.

According to an aspect of the present invention, an apparatus for a receiver in a MIMO wireless communication system includes: an RF processor for converting signals, received through multiple antennas, into baseband signals; a channel estimator for estimating channel information of the respective antennas by using the received signals; and a signal detector for arranging the baseband signals of the respective antennas on the basis of the channel information, calculating a threshold value of each stage, and selecting symbols with a cumulative metric smaller than or equal to the threshold value as candidates at each stage, to detect a TX signal vector with N number of symbols.

According to another aspect of the present invention, a method for detecting a TX signal vector at a receiver in a MIMO wireless communication system includes: converting signals, received through multiple antennas, into baseband signals; estimating channel information of the respective antennas by using the received signals; arranging the baseband signals of the respective antennas on the basis of the channel information; and calculating a threshold value of each stage and selecting symbols with a cumulative metric smaller than or equal to the threshold value as candidates at each stage, to detect a TX signal vector with N number of symbols.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior uses, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 5A to 5F are diagrams illustrating an example of tree search in a MIMO wireless communication system according to the present invention.

DETAILED DESCRIPTION OF THE INVENTION

Figure 1:
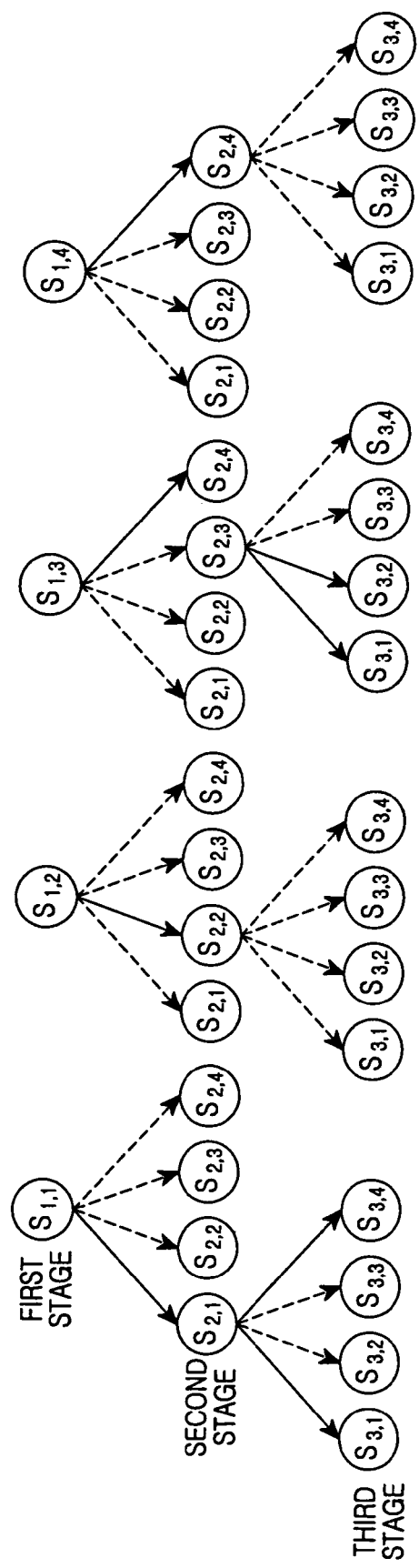
FIG. 1 is a diagram illustrating an example of a tree structure for a QRD-M detection scheme in a MIMO wireless communication system.

FIGS. 2 through 6B, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

The present invention is intended to provide techniques for performing modified QRD-M detection, which has low computational complexity while having a similar complexity to ML detection, in a MIMO wireless communication system.

In a general QRD-M detection scheme, a receiver selects M number of candidates at each stage of a symbol tree. Thus, for expansion to the next stage, the receiver must calculate cumulative metrics for (M×modulation order) number of symbol combinations. Herein, the metric is the square of the Euclidean distance between an RX symbol and a transmittable symbol. On the other hand, in a detection scheme according to the present invention, a receiver sets a threshold value at each stage without selecting M number of candidates at each stage. The receiver selects symbol combinations, which have a cumulative metric of the size smaller than or equal to the threshold value, as candidates. Thus, for expansion to the next stage, the receiver of the present invention calculates {M×modulation order} number of cumulative metrics only in the worst case.

Herein, the threshold value at each stage is determined as follows. The receiver selects q number of symbol combinations at a newly expanded stage in ascending order of the cumulative metric, estimates the final symbol combinations from the selected symbol combinations according to a decision feedback (DF) detection scheme, and sets the minimum final cumulative metric among the final cumulative metrics of the respective final symbol combinations to the threshold value of the corresponding stage. Preferably, 'q' is smaller than 'M'.

Hereinafter, the detection scheme according to the present invention will be described in detail. The following description assumes that a Quadrature Phase Shift Keying (QPSK) modulation scheme is used, three TX antennas and three RX antennas are used, 'M' is 4, and 'q' is 2; and refers to a specific example as illustrated in FIGS. 5A to 5F.

First, an RX signal can be expressed as Equation 1:

$$r = Hs + n, \qquad [\text{Eqn. 1}]$$

where r denotes an RX signal vector, H denotes a channel matrix, denotes a TX signal vector, and n denotes a noise vector.

In Equation 1, the channel matrix H has a size of {the number of TX antennas}×{the number of RX antennas} and has independent and identically distributed (i.i.d.) elements.

When the channel matrix is QR-decomposed, the RX signal can be expressed as Equation 2:

$$r = QRs + n \qquad [\text{Eqn. 2}]$$

Here, $$Q^H Q = I$$

$$R = \begin{bmatrix} R_{N_t,N_t} & R_{N_t,N_t-1} & \cdots & R_{N_t,1} \\ 0 & R_{N_t-1,N_t-1} & \cdots & R_{N_t-1,1} \\ \vdots & \ddots & \ddots & \vdots \\ 0 & \cdots & 0 & R_{1,1} \end{bmatrix},$$

where r denotes an RX signal vector, s denotes a TX signal vector, n denotes a noise vector, and $N_t$ denotes the number of TX antennas.

Multiplying each side of Equation 2 by $Q^H$ results in Equation 3:

$$y = Q^H r = Q^H QRs + Q^H n = Rs + n' \qquad [\text{Eqn. 3}]$$

$$= \begin{bmatrix} R_{N_t,N_t} & R_{N_t,N_t-1} & \cdots & R_{N_t,1} \\ 0 & R_{N_t-1,N_t-1} & \cdots & R_{N_t-1,1} \\ \vdots & \ddots & \ddots & \vdots \\ 0 & \cdots & 0 & R_{1,1} \end{bmatrix} \begin{bmatrix} s_{N_t} \\ s_{N_t-1} \\ \vdots \\ s_1 \end{bmatrix} +$$

$$\begin{bmatrix} n'_{N_t} \\ n'_{N_t-1} \\ \vdots \\ n'_1 \end{bmatrix},$$

where r denotes an RX signal vector, y is the product of r and $Q^H$, denotes a TX signal vector, n denotes a noise vector, n' is the product of n and $Q^H$, and $N_t$ denotes the number of TX antennas.

Thereafter, the receiver uses Equation 4 to calculate metrics for all cases transmittable as the first symbol $s_1$:

$$m_{1,k} = |y_1 - R_{1,1} S_{1,k}|^2, \qquad [\text{Eqn. 4}]$$

where $m_{1,k}$ denotes the metric of the $k^{th}$ symbol among the symbols transmittable for the first symbol, $y_1$ denotes the received first symbol, R denotes an upper triangular matrix obtained by QR decomposition, and $S_{1,k}$ denotes the $k^{th}$ symbol among the symbols transmittable as the first symbol.

Figures 5A, 5B, 5C, 5D, 5E, 5F:
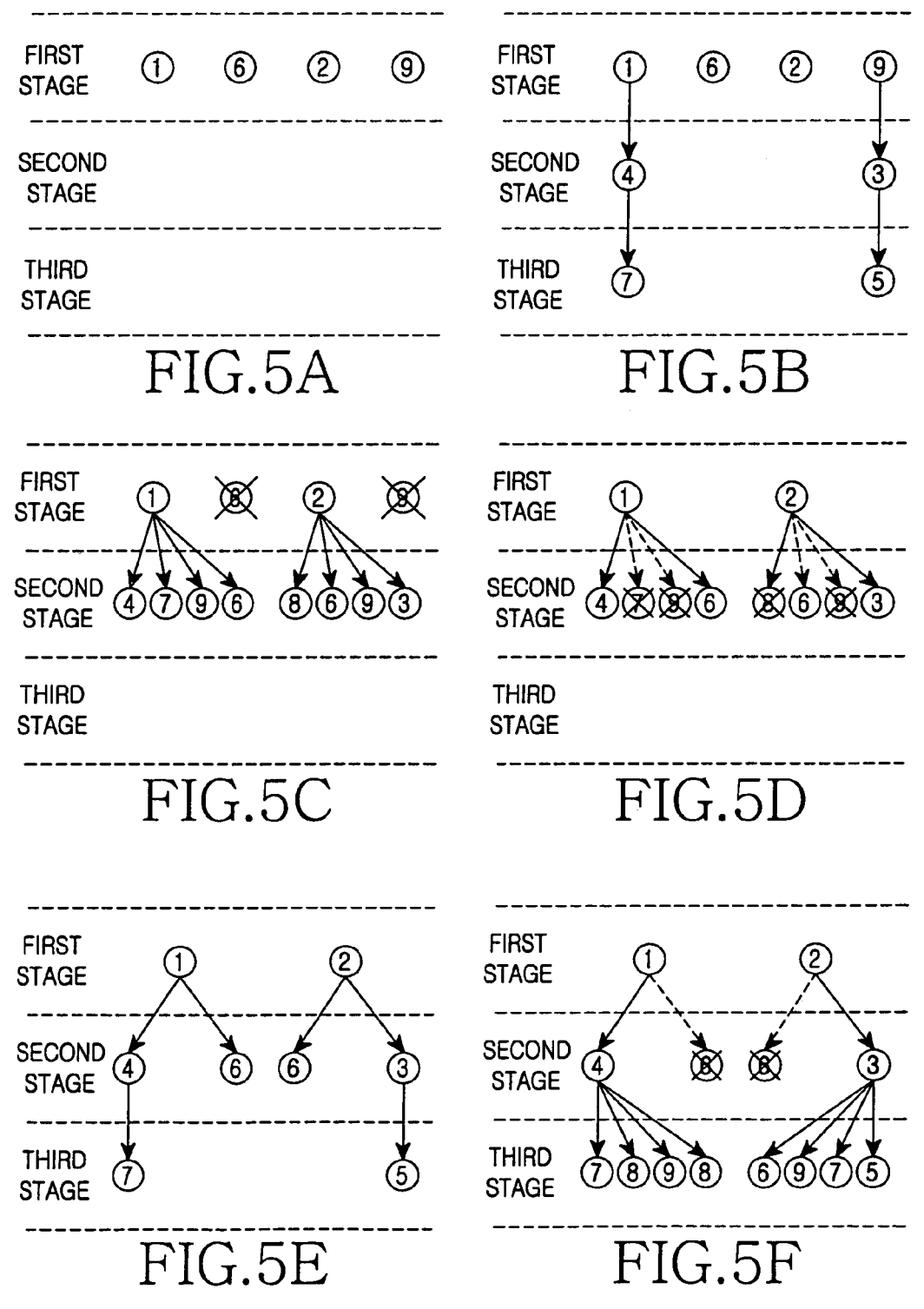

For example, as illustrated in FIG. 5A, four metrics are calculated at the first state. In FIG. 5A, circles denote transmittable symbols, and numerals in the respective circles denote metrics for the corresponding symbols, which are randomly set for convenience in description. After calculation of the metrics, other symbols than M (=4) number of symbols with small metrics are excluded from the first stage. In such a case as FIG. 5A, all the metrics are selected because the modulation order is equal to M. Thereafter, q (=2) number of symbols with small metrics are selected and used to calculate a candidate selection threshold value. Thereafter, as illustrated in FIG. 5B, q number of the final symbol combinations are estimated by a DF detection scheme on the basis of the selected q symbols.

Herein, the DF detection scheme repeats symbol estimation and interference cancellation in the order arranged by a matrix R. For example, after signals are arranged as Equation 3, the receiver divides $y_1$ by $R_{1,1}$ to estimate $s_1$, removes $s_1$ and $R_{2,2}$ components from $y_2$, and divides the result by $R_{2,1}$ to estimate $s_2$. The DF detection scheme repeats the above symbol estimation/interference cancellation operation $N_t$ times to detect all the symbols.

The final cumulative metric of each of the final symbol combinations is calculated as Equation 5:

$$\theta_{\hat{s}_{DF_{ij}}} = \|y - R\hat{s}_{DF_{ij}}\|^2, \quad [\text{Eqn. 5}]$$

where $\theta_{\hat{s}_{DF_{ij}}}$ denotes the final cumulative metric calculated on the basis of the $j^{th}$ candidate selected at the $i^{th}$ stage, y is the product of $Q^H$ and an RX signal vector, R denotes an upper triangular matrix obtained by QR decomposition, and $\hat{s}_{DF_{ij}}$ denotes the final symbol combination estimated by a DF detection scheme on the basis of the $j^{th}$ symbol selected at the $i^{th}$ stage.

After the final cumulative metrics for the selected q symbols are calculated as Equation 5, a threshold value of the first stage is determined as Equation 6:

$$\theta_{\hat{s}_{DF_i}} = \min_{j \in \{1, 2, \ldots, q\}} \theta_{\hat{s}_{DF_{ij}}}, \quad [\text{Eqn. 6}]$$

where $\theta_{\hat{s}_{DF_i}}$ denotes the threshold value of the $i^{th}$ stage, and $\theta_{\hat{s}_{DF_{ij}}}$ denotes the final cumulative metric calculated on the basis of the $j^{th}$ symbol selected at the $i^{th}$ stage.

That is, if the calculated final cumulative metrics are '7' and '5' as illustrated in FIG. 5B, the minimum metric '5' is determined as the threshold value of the first stage. In this manner, the determination of the candidate selection threshold value by the DF detection scheme is based on Equation 7:

$$\|y - R\hat{s}_{DF}\|^2 \geq \|y - R\hat{s}_{ML}\|^2, \quad [\text{Eqn. 7}]$$

where y is the product of $Q^H$ and an RX signal vector, R denotes an upper triangular matrix obtained by QR decomposition, $\hat{s}_{DF}$ denotes a TX signal vector estimated by a DF detection scheme, and $\hat{s}_{ML}$ denotes a TX signal vector estimated by an ML detection scheme.

That is, as shown in Equation 7, the square of the Euclidean distance of the TX signal vector estimated by the DF detection scheme is greater than or equal to the square of the Euclidean distance of the TX signal vector estimated by the ML detection scheme. Thus, it can be determined that the symbol combination, which has the cumulative metric greater than the square of the Euclidean distance of the TX signal vector already estimated by the DF detection scheme at the intermediate stage, has a great difference from the TX signal vector. Thus, since removing the symbol combination having the cumulative metric greater than the square of the Euclidean distance of the TX signal vector estimated by the DF detection scheme is equivalent to removing an unnecessary symbol combination, the computational complexity of the receiver is reduced. Also, since as many unnecessary symbol combinations as possible must be removed, it is preferable that the minimum final cumulative metric is determined as the threshold value.

If the threshold value is determined as '5', symbols with cumulative metrics greater than the threshold value '5' are excluded from candidates and thus two symbols are selected as candidates as illustrated in FIG. 5C. Thus, only the selected two symbols are expanded into the second stage. That is, as many symbol combinations as the modulation order are newly generated from each of the selected two symbols. Thereafter, other symbol combinations than M (=4) number of symbol combinations with small cumulative metrics among the newly generated symbol combinations are excluded as illustrated in FIG. 5D. Referring to FIG. 5D, eight symbols with cumulative metrics of '4', '7', '9', '6', '8', '6', '9' and '3' were generated, but there remain only M (=4) number of symbol combinations with cumulative metrics of '4', '6', '6' and '3'. Thereafter, for determination of the threshold value of the second stage, q (=2) number of symbol combinations with small cumulative metrics are selected and the final cumulative metrics are calculated by the DF detection scheme on the basis of the selected q symbol combinations, as illustrated FIG. 5E. If the final cumulative metrics are '7' and '5' as illustrated in FIG. 5E, the threshold value of the second stage is determined as '5' according to Equation 6. Thus, as illustrated in FIG. 5F, symbol combinations with cumulative metrics greater than '5' are excluded from candidates and the remaining symbol combinations are expanded into the third stage. In such a case as FIGS. 5A to 5F, since the third stage is the last stage, the symbol combination with the minimum cumulative metric among the generated 8 symbol combinations is determined as the TX symbol vector.

Hereinafter, the construction and operation of the receiver for detecting signals according to the above-described scheme will be described in detail with reference to the accompanying drawings.

Figure 2:
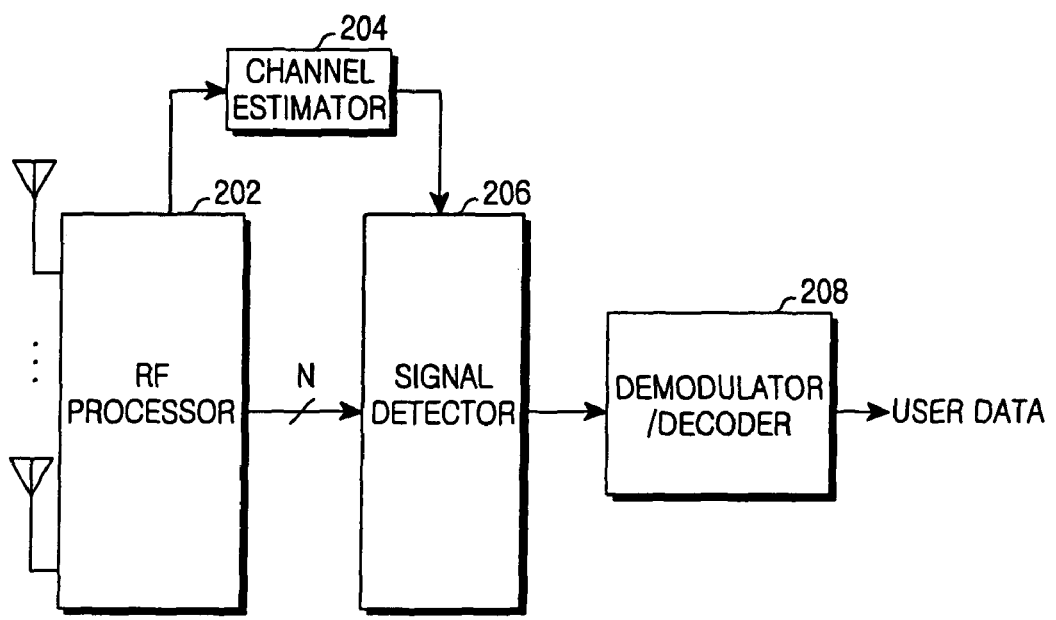
FIG. 2 is a block diagram of a receiver in a MIMO wireless communication system according to an embodiment of the present invention.

FIG. 2 is a block diagram of a receiver in a MIMO wireless communication system according to an embodiment of the present invention.

Referring to FIG. 2, the receiver includes a radio frequency (RF) processor 202, a channel estimator 204, a signal detector 206, and a demodulator/decoder unit 208.

The RF processor 202 converts RF signals, received through multiple RX antennas, into baseband signals. That is, on an antenna-by-antenna basis, the RF processor 202 amplifies and downconverts RF signals, received through multiple RX antennas, to output baseband signals. Also, the RF processor 202 provides a signal for channel estimation to the channel estimator 204, and outputs data signals to the signal detector 206.

Using a signal received from the RF processor 202, the channel estimator 204 estimates each antenna channel with a corresponding transmitter to generate a channel matrix. For example, using a known signal such as a pilot signal among RX signals, the channel estimator 204 calculates the channel coefficients of a pair of each TX antenna and each RX antenna to generate a channel matrix with a size of {the number of TX antennas}×{the number of RX antennas}.

The signal detector 206 estimates a TX signal vector using an RX signal vector. The detailed configuration and operation of the signal detector 206 will be described later in detail with reference to FIG. 3. The demodulator/decoder unit 208 demodulates symbols, received from the signal detector 206, into a coded bit stream, i.e., a codeword, and decodes the codeword into user data.

Figure 3:
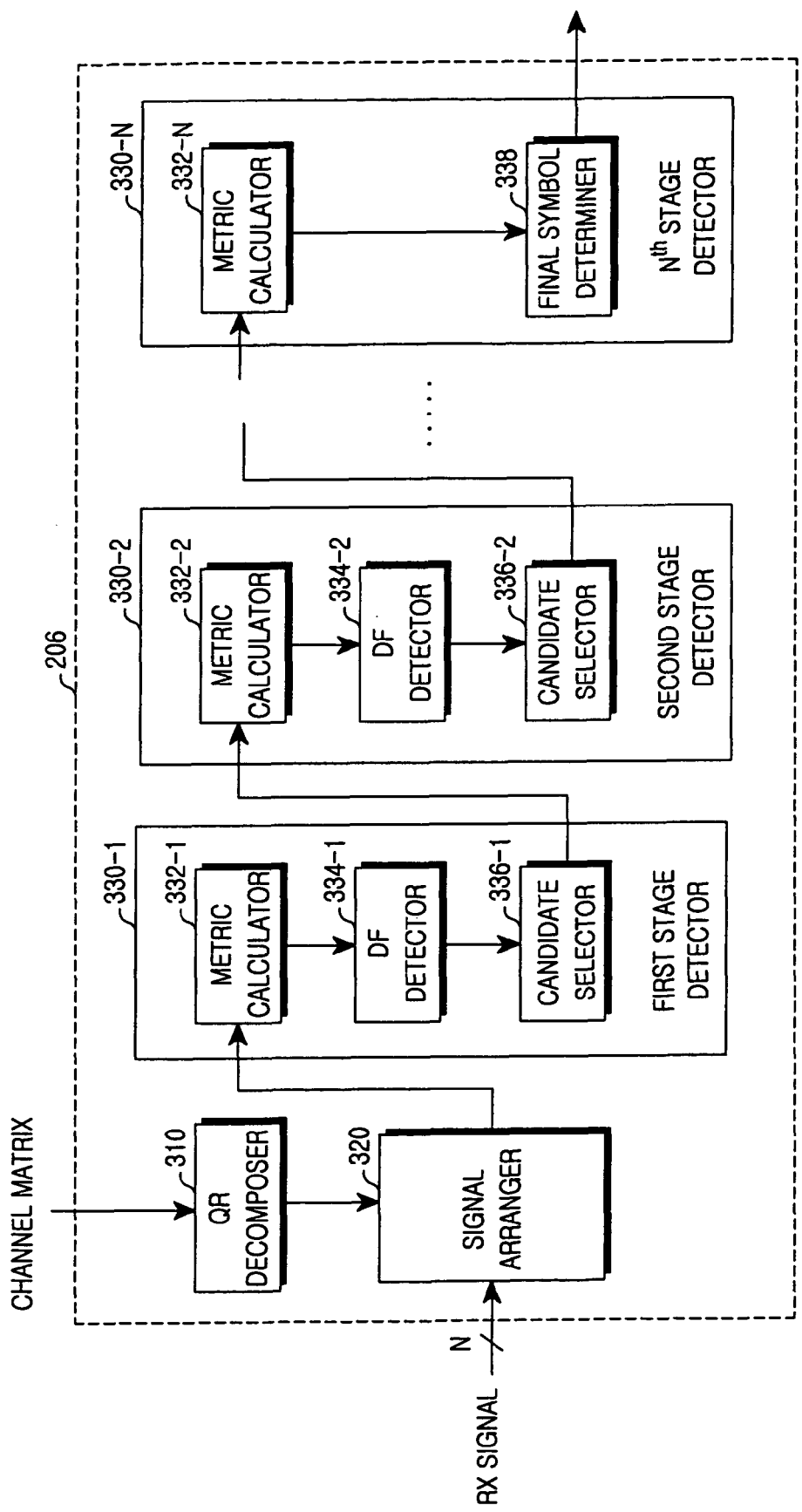
FIG. 3 is a block diagram of a signal detector in a MIMO wireless communication system according to an embodiment of the present invention.

FIG. 3 is a block diagram of the signal detector in a MIMO wireless communication system according to an embodiment of the present invention.

Referring to FIG. 3, the signal detector 206 includes a QR decomposer 310, signal arranger 320, and a plurality of detectors 330-1 through 330-N.

The QR decomposer 310 decomposes a received channel matrix into a matrix Q and a matrix R. The matrix Q is a matrix that becomes a unit matrix when multiplied by its Hermitian matrix, and the matrix R is a triangular matrix that becomes a channel matrix when multiplied by the matrix Q. The signal arranger 320 multiplies an RX signal vector by a matrix $Q^H$, and arranges signals in the order to be detected.

The first stage detector 330-1 includes a metric calculator 332-1, a DF detector 334-1, and a candidate selector 336-1, and determines the candidates of the first stage. The metric calculator 332-1 calculates the metrics of all symbols transmittable at the first stage. That is, the metric calculator 332-1 calculates the metric of each symbol as shown in Equation 4. Also, the metric calculator 332-1 selects q number of symbols with small metrics to provide the selected q symbols to the DF detector 334-1, and selects M number of symbols with small metrics to provide the selected M symbols to the candidate selector 336-1.

The DF detector 334-1 estimates q number of the final symbol combinations by the DF detection scheme on the basis of the selected q symbols received from the metric calculator 332-1. That is, in the order arranged by the matrix R, the DF detector 334-1 first estimates the previous symbol, cancels an interference caused by the estimated symbol, and estimates the next symbol, thereby estimating the q final symbol combinations.

The candidate selector 336-1 calculates the final cumulative metric of each of the q final symbol combinations received from the DF detector 334-1, and sets the minimum final cumulative metric to a candidate selection threshold value of the first stage. Also, among the M symbols received from the metric calculator 332-1, the candidate selector 336-1 selects the symbol, which has a cumulative metric smaller than or equal to the candidate selection threshold value, as the candidate symbol of the first stage. For expansion to the second stage, the candidate symbol of the first stage is provided to the second stage detector 330-2.

The second stage detector 330-2 includes a metric calculator 332-2, a DF detector 334-2, and a candidate selector 336-2, and determines the candidate symbol combinations of the second stage in the same way as in the first stage detector 330-1. The metric calculator 332-2 constructs as many symbol combinations as {the number of the candidate symbols of the first stage}×{the modulation order} by combining all symbols transmittable for the respective candidate symbols of the first stage received from the first stage detector 330-1, and calculates the cumulative metrics of the respective symbol combinations up to the second stage. That is, according to Equation 4, the metric calculator 332-2 calculates the metric of each symbol selectable as the second symbol, and adds the calculated metric and the metric of the first symbol. Also, the metric calculator 332-2 selects q number of symbol combinations with small metrics to provide the selected q symbol combinations to the DF detector 334-2, and selects M number of symbol combinations with small metrics to provide the selected M symbol combinations to the candidate selector 336-2.

The DF detector 334-2 and the candidate selector 336-2 perform the same functions as the DF detector 334-1 and the candidate selector 336-1 of the first stage detector 330-1, to select the candidate symbol combinations of the second stage. The candidate symbol combinations of the second stage are provided to the next stage detector.

The $N^{th}$ stage detector 330-N is the detector for the last stage. The $N^{th}$ stage detector 330-N includes a metric calculator 332-N and a final symbol determiner 338, and selects the final symbol combination to be provided to the demodulator/decoder unit 208.

The metric calculator 332-N constructs as many symbol combinations as {the number of the candidate symbols of the $(N-1)^{th}$ stage}×{the modulation order} by combining all symbols transmittable for the respective candidate symbols of up to the $(N-1)^{th}$ stage received from the $(N-1)^{th}$ stage detector, and calculates the cumulative metrics of the respective symbol combinations up to the last stage. The final symbol determiner 338 selects the symbol combination with the minimum cumulative metric among the symbol combinations received from the metric calculator 332-N as a TX symbol vector, and provides the selected TX symbol vector to the demodulator/decoder unit 208.

FIG. 3 illustrates that the first stage detector 330-1 through the $N^{th}$ stage detector 330-N are separately provided to select the candidates of the corresponding stages, but this is to show that the signal detection is performed stage by stage. In another embodiment, the signal detector 206 includes a single detector to repetitively perform the same function, thereby determining the final symbol combination.

Figure 4:
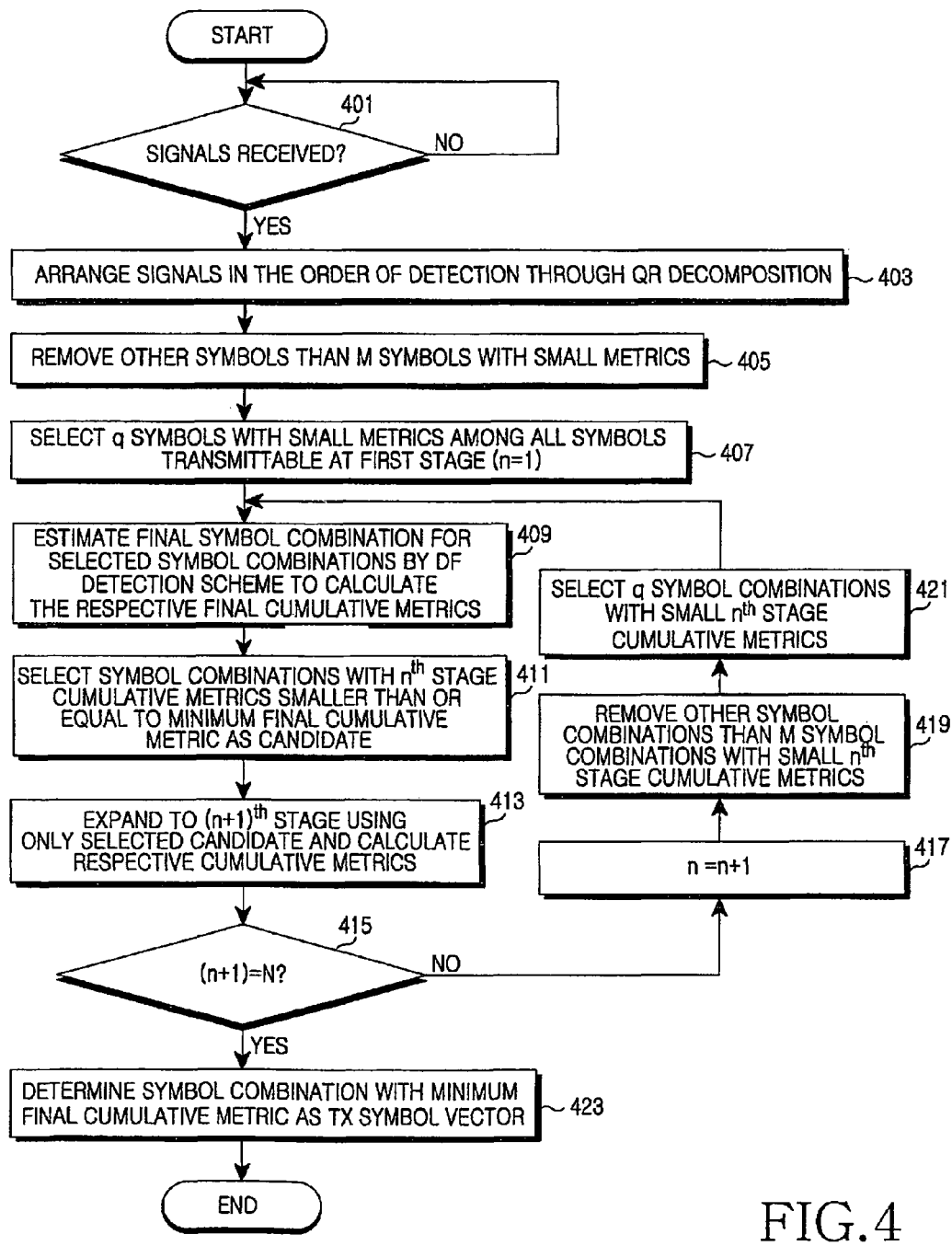
FIG. 4 is a flowchart illustrating a signal detection process of the receiver in a MIMO wireless communication system according to an embodiment of the present invention.

FIG. 4 is a flowchart illustrating a signal detection process of the receiver in a MIMO wireless communication system according to an embodiment of the present invention.

Referring to FIG. 4, in step 401, the receiver determines whether signals are received through multiple antennas.

If signals are received through multiple antennas (in step 401), the signal detection process proceeds to step 403. In step 403, the receiver estimates a channel matrix, QR-decomposes the channel matrix to generate a matrix R, and uses the matrix R to arrange the signals of the respective antennas in the order to be detected.

In step 405, the receiver calculates the metric of each of all of the symbols transmittable at the first stage, and selects q number of symbols with small metrics. For example, the metric is calculated as Equation 4.

In step 407, the receiver estimates q number of the final symbol combinations by the DF detection scheme according to the selected q symbols, and calculates the final cumulative metric of each of the final symbol combinations. That is, in the order arranged by a matrix R, the receiver first estimates the previous symbol, cancels an interference caused by the estimated symbol, and estimates the next symbol, thereby estimating the final symbol combinations. Thereafter, the receiver calculates the final cumulative metric of each of the final symbol combinations.

In step 409, the receiver sets the minimum final cumulative metric to a threshold value of the $n^{th}$ (=$1^{st}$) stage, and selects the symbol combinations up to the $n^{th}$ (=$1^{st}$) stage, which have cumulative metrics smaller than or equal to the threshold value, as the candidate symbol combinations of the $n^{th}$ (=$1^{st}$) stage.

In step 411, using only the candidate symbol combinations selected in step 409, the receiver expands symbol combinations to the $(n+1)^{th}$ stage. That is, the receiver constructs as many symbol combinations as {the number of the candidate symbol combinations of the $(n+1)^{th}$ stage}×{the modulation order} by combining respective symbols transmittable for the candidate symbol combination. In step 413, the receiver calculates the cumulative metrics of the expanded symbol combinations.

In step 415, the receiver determines whether the $(n+1)^{th}$ stage is the last stage. If the $(n+1)^{th}$ stage is not the last stage (in step 415), the signal detection process proceeds to step 417. In step 417, the receiver increases 'n' by 1.

In step 419, the receiver removes other symbol combinations than M number of symbol combinations with small cumulative metrics up to the n $(=2)^{th}$ stage. That is, regardless of the threshold value, the receiver excludes other symbol combinations than the M symbol combinations.

In step 421, the receiver selects q number of symbol combinations with small cumulative metrics up to the n $(=2)^{th}$ stage. Thereafter, the signal detection process returns to step 409 so that the receiver repeat steps 409 through 421 until the condition of step 415 is satisfied.

On the other hand, if the $(n+1)^{th}$ stage is the last stage (in step 415), the signal detection process proceeds to step 423. In step 423, the receiver determines the symbol combination with the minimum final cumulative metric to be a TX symbol vector. Thereafter, the TX symbol vector is demodulated and decoded into user data.

Figure 6A:
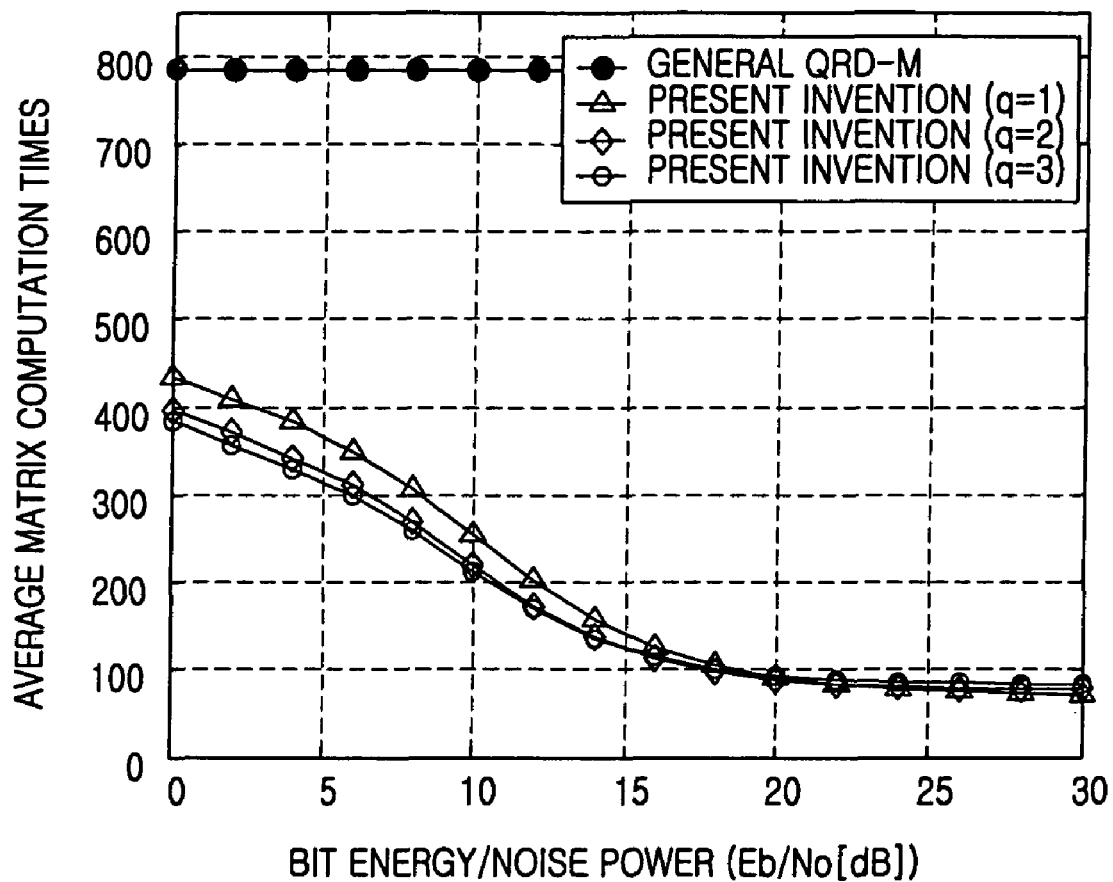
FIGS. 6A and 6B are graphs illustrating the performance of a signal detection scheme according to the present invention.
Figure 6B:
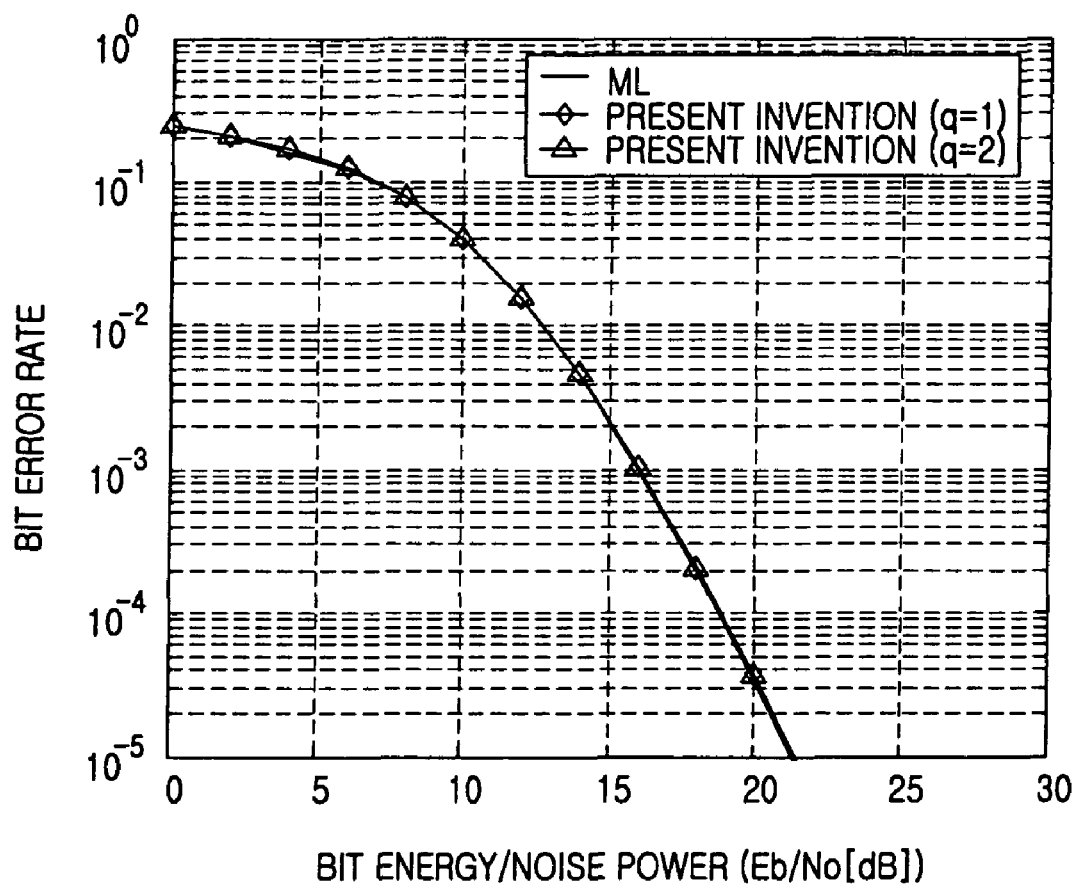

FIGS. 6A and 6B are graphs illustrating the performance of a signal detection scheme according to the present invention. FIGS. 6A and 6B illustrate simulation result graphs of the receiver using the detection scheme according to the present invention. In the simulation, four TX antennas, four RX antennas, and a 16 Quadrature Amplitude Modulation (16 QAM) is used.

FIG. 6A compares the computational complexity of a QRD-M detection scheme with the computational complexity of the detection scheme according to the present invention. In FIG. 6A, the axis of abscissas represents bit energy/noise power (Eb/No), and the axis of ordinates represents the average matrix computation times. It can be seen from FIG. 6A that the computation complexity of the detection scheme according to the present invention is considerably lower than the computational complexity of the QRD-M detection scheme. Also, it can be seen that the computation complexity of the detection scheme according to the present invention decreases with an increase in the Eb/No, i.e., an improvement in the channel state.

FIG. 6B compares the error rate of an ML detection scheme with the error rate of the detection scheme according to the present invention. In FIG. 6B, the axis of abscissas represents bit energy/noise power (Eb/No), and the axis of ordinates represents a bit error rate. It can be seen from FIG. 6B that the error rate of the detection scheme according to the present invention is very close to the error rate of the ML detection scheme.

As described above, the present invention uses the DF detection scheme to determine the candidate selection threshold value for QRD-M detection in the MIMO wireless communication system, thereby achieving the performance approaching that of the ML detection scheme with low computational complexity.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An apparatus for a receiver in a Multiple Input Multiple Output (MIMO) wireless communication system, the apparatus comprising:

a radio frequency (RF) processor configured to convert signals, received through multiple antennas, into baseband signals;

a channel estimator configured to estimate channel information of the respective antennas by using the received signals; and a signal detector configured to:

arrange the baseband signals of the respective antennas based on the channel information;

calculate a final cumulative metric between a receive (RX) symbol combination and each of a plurality of final symbol combinations detected by a decision feedback (DF) detection scheme based on a subset of symbol combinations of an $n^{th}$ stage, the final symbol combinations determined at a final stage, wherein a number of stages corresponds to a number of transmission antennas;

set a minimum final cumulative metric to a threshold value of the $n^{th}$ stage;

select symbols with a final cumulative metric smaller than or equal to the threshold value as candidates at each stage;

add all transmittable symbols to a candidate symbol combination of an $(n-1)^{th}$ stage to generate the symbol combinations of the $n^{th}$ stage;

calculate a cumulative metric for each symbol combination up to the $n^{th}$ stage; and select the symbol combination with a cumulative metric smaller than or equal to the threshold value calculated using the symbol combinations as the candidate symbol combination of the $n^{th}$ stage, to detect a transmit (TX) signal vector with N number of symbols.

2. The apparatus of claim 1, wherein the signal detector QR-decomposes a channel matrix with the channel information of the respective antennas, and arranges the received signals according to an upper triangular matrix R obtained by the QR decomposition.

3. The apparatus of claim 2, wherein the signal detector combines the N symbols transmittable for the candidate symbol combinations of the $(n-1)^{th}$ stage to construct the symbol combinations of the $n^{th}$ stage, and determines the symbol combination with the minimum final cumulative metric as a TX symbol vector.

4. The apparatus of claim 2, wherein the metric is the square of a Euclidean distance between a receive (RX) signal and a transmittable symbol.

5. The apparatus of claim 1, wherein the signal detector combines the N symbols transmittable for the candidate symbol combinations of the $(n-1)^{th}$ stage to construct the symbol combinations of the $n^{th}$ stage, and determines the symbol combination with the minimum final cumulative metric as a TX symbol vector.

6. The apparatus of claim 1, wherein the metric is the square of a Euclidean distance between a receive (RX) signal and a transmittable symbol.

7. The apparatus of claim 1, wherein the signal detector determines the threshold value according to the following equation, $$\theta_{sDF_i} = \min_{j \in \{1,2,\ldots,q\}} \theta_{sDF_{ij}}$$

where $\theta_{sDF_i}$ denotes a threshold value of an $i^{th}$ stage, and $\theta_{sDF_{ij}}$ denotes the final cumulative metric calculated based on a $j^{th}$ symbol selected at the $i^{th}$ stage, and q is a number of symbol combinations.

8. A method for detecting a transmit (TX) signal vector at a receiver in a Multiple Input Multiple Output (MIMO) wireless communication system, the method comprising:
converting signals, received through multiple antennas, into baseband signals;
estimating channel information of the respective antennas by using the received signals;
arranging the baseband signals of the respective antennas based on the channel information;
calculating a final cumulative metric between a receive (RX) symbol combination and each of a plurality of final symbol combinations detected by a decision feedback (DF) detection scheme based on a subset of symbol combinations of an $n^{th}$ stage, the final symbol combinations determined at a final stage, wherein a number of stages corresponds to a number of transmission antennas;
setting a minimum final cumulative metric to a threshold value of the $n^{th}$ stage;
selecting symbols with a final cumulative metric smaller than or equal to the threshold value as candidates at each stage;
adding all transmittable symbols to a candidate symbol combination of an $(n-1)^{th}$ stage to generate the symbol combinations of the $n^{th}$ stage;
calculating a cumulative metric for each symbol combination up to the $n^{th}$ stage; and
selecting the symbol combination with a cumulative metric smaller than or equal to the threshold value calculated using the symbol combinations as the candidate symbol combination of the $n^{th}$ stage, to detect a TX signal vector with N number of symbols.

9. The method of claim 8, wherein the arranging of the baseband signals of the respective antennas comprises:
QR-decomposing a channel matrix with the channel information of the respective antennas; and
arranging the received signals according to an upper triangular matrix R obtained by the QR decomposition.

10. The method of claim 9, further comprising:
combining the N symbols transmittable for the candidate symbol combinations of the $(n-1)^{th}$ stage to construct the symbol combinations of the $n^{th}$ stage; and
determining the symbol combination with the minimum final cumulative metric as a TX symbol vector.

11. The method of claim 9, wherein the metric is the square of a Euclidean distance between a receive (RX) signal and a transmittable symbol.

12. The method of claim 8, wherein the metric is the square of a Euclidean distance between a receive (RX) signal and a transmittable symbol.

13. The method of claim 8, further comprising:
combining the N symbols transmittable for the candidate symbol combinations of the $(n-1)^{th}$ stage to construct the symbol combinations of the $n^{th}$ stage; and
determining the symbol combination with the minimum final cumulative metric as a TX symbol vector.

14. The method of claim 8, wherein threshold value is determined according to the following equation, $$\theta_{\tilde{s}DF_i} = \min_{j \in \{1,2,\ldots,q\}} \theta_{\tilde{s}DF_{ij}}$$

where $\theta_{\tilde{s}DF_i}$ denotes a threshold value of an $i^{th}$ stage, and $\theta_{\tilde{s}DF_{ij}}$ denotes the final cumulative metric calculated based on a $j^{th}$ symbol selected at the $i^{th}$ stage, and q is a number of symbol combinations.

15. A receiver in a Multiple Input Multiple Output (MIMO) wireless communication system, the receiver comprising:
a radio frequency (RF) processor configured to convert signals, received through multiple antennas, into baseband signals;
a channel estimator configured to estimate channel information of the respective antennas by using the received signals;
a demodulator configured to demodulate symbols into a coded bit stream; and
a signal detector configured to:
arrange the baseband signals of the respective antennas based on the channel information;
calculate a final cumulative metric between a receive (RX) symbol combination and each of a plurality of final symbol combinations detected by a decision feedback (DF) detection scheme based on a subset of symbol combinations of an $n^{th}$ stage, the final symbol combinations determined at a final stage, wherein a number of stages corresponds to a number of transmission antennas;
set a minimum final cumulative metric to a threshold value of the $n^{th}$ stage;
select symbols with a final cumulative metric smaller than or equal to the threshold value as candidates at each stage;
add all transmittable symbols to a candidate symbol combination of an $(n-1)^{th}$ stage to generate the symbol combinations of the $n^{th}$ stage,
calculate a cumulative metric for each symbol combination up to the $n^{th}$ stage; and
select the symbol combination with a cumulative metric smaller than or equal to the threshold value calculated using the symbol combinations as the candidate symbol combination of the $n^{th}$ stage, to detect a transmit (TX) signal vector with N number of symbols.

16. The receiver of claim 15, wherein the signal detector QR-decomposes a channel matrix with the channel information of the respective antennas, and arranges the received signals according to an upper triangular matrix R obtained by the QR decomposition.

17. The receiver of claim 16, wherein the metric is the square of a Euclidean distance between a receive (RX) signal and a transmittable symbol.

18. The receiver of claim 15, wherein the signal detector combines the N symbols transmittable for the candidate symbol combinations of the $(n-1)^{th}$ stage to construct the symbol combinations of the $n^{th}$ stage, and determines the symbol combination with the minimum final cumulative metric as a TX symbol vector.

19. The receiver of claim 15, wherein the metric is the square of a Euclidean distance between a receive (RX) signal and a transmittable symbol.

20. The receiver of claim 15, wherein the signal detector determines the threshold value according to the following equation, $$\theta_{\hat{s}DF_i} = \min_{j \in \{1,2,\ldots,q\}} \theta_{\hat{s}DF_{ij}}$$

where $\theta_{\hat{s}DF_i}$ denotes a threshold value of an $i^{th}$ stage, and $\theta_{\hat{s}DF_{ij}}$ denotes the final cumulative metric calculated based on a $j^{th}$ symbol selected at the $i^{th}$ stage, and q is a number of symbol combinations.

\* \* \* \* \*

UNITED STATES PATENT AND TRADEMARK OFFICE
CERTIFICATE OF CORRECTION

| | | |
|---|---|---|
| PATENT NO. | : 8,345,806 B2 | Page 1 of 1 |
| APPLICATION NO. | : 12/154954 | |
| DATED | : January 1, 2013 | |
| INVENTOR(S) | : Jung et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1044 days.

Signed and Sealed this
Twenty-eighth Day of October, 2014

Michelle K. Lee
*Deputy Director of the United States Patent and Trademark Office*